(12) United States Patent
Jog

(10) Patent No.: US 12,541,571 B2
(45) Date of Patent: Feb. 3, 2026

(54) QUANTIFYING MACHINE LEARNING MODEL UNCERTAINTY

(71) Applicant: International Business Machines Corporation, Armonk, NY (US)

(72) Inventor: Amod Jog, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 1036 days.

(21) Appl. No.: 17/079,882

(22) Filed: Oct. 26, 2020

(65) Prior Publication Data

US 2022/0129707 A1 Apr. 28, 2022

(51) Int. Cl.
| | |
|---|---|
| *G06F 18/21* | (2023.01) |
| *G06F 18/22* | (2023.01) |
| *G06F 18/2415* | (2023.01) |
| *G06N 3/08* | (2023.01) |
| *G06N 20/00* | (2019.01) |
| *G06V 10/75* | (2022.01) |

(52) U.S. Cl.
CPC ............ *G06F 18/217* (2023.01); *G06F 18/22* (2023.01); *G06F 18/2415* (2023.01); *G06N 3/08* (2013.01); *G06N 20/00* (2019.01); *G06V 10/751* (2022.01)

(58) Field of Classification Search
CPC ........ G06F 18/217; G06F 18/21; G06F 18/22; G06F 18/2415; G06F 18/241; G06F 18/24; G06N 20/00; G06N 3/08; G06N 3/02; G06V 10/751; G06V 10/75; G06V 10/74
USPC ..................................................... 706/15, 25
See application file for complete search history.

(56) References Cited

U.S. PATENT DOCUMENTS

| | | | |
|---|---|---|---|
| 2016/0210535 A1* | 7/2016 | Takimoto | G06F 18/217 |
| 2017/0278114 A1* | 9/2017 | Renders | G06Q 30/0282 |
| 2018/0114113 A1 | 4/2018 | Ghahramani | |
| 2018/0165809 A1 | 6/2018 | Stanitsas | |
| 2019/0122073 A1* | 4/2019 | Ozdemir | G06N 3/09 |
| 2019/0130256 A1* | 5/2019 | Ghahramani | G06N 3/09 |
| 2019/0163666 A1* | 5/2019 | Cakmak | G06N 5/02 |
| 2020/0134374 A1* | 4/2020 | Oros | G06N 3/09 |
| 2020/0320354 A1* | 10/2020 | Ghesu | G06F 18/2155 |
| 2020/0320371 A1* | 10/2020 | Baker | G06N 3/088 |
| 2021/0070322 A1* | 3/2021 | Noy | G06N 3/08 |
| 2021/0312248 A1* | 10/2021 | Tchuiev | G06N 3/0464 |
| 2021/0358577 A1* | 11/2021 | Zhang | G06N 3/0499 |

(Continued)

FOREIGN PATENT DOCUMENTS

WO 2020031188 A1 2/2020

OTHER PUBLICATIONS

Gal et al., "Dropout as a Bayesian Approximation: Appendix", arXiv: 1506.02157v5, May 26, 2016, pp. 1-20. (Year: 2016).*

(Continued)

*Primary Examiner* — Hwei-Min Lu
(74) *Attorney, Agent, or Firm* — David K. Mattheis

(57) ABSTRACT

Evaluating machine learning model classifications, training a machine learning classification model using a training data set from a first data distribution, determining a classification for test data from a second data distribution using the machine learning classification model, wherein the first data distribution and the second data distribution are disjoint distributions, determining an uncertainty for the classification of the test data according to a difference between the first data distribution and the second data distribution.

20 Claims, 4 Drawing Sheets

(56) References Cited

U.S. PATENT DOCUMENTS

| | | | |
|---|---|---|---|
| 2022/0018221 A1* | 1/2022 | Zhang | E21B 43/00 |
| 2022/0270756 A1* | 8/2022 | Yi | G06N 3/0495 |
| 2023/0289568 A1* | 9/2023 | Eichler | G06N 3/084 |

OTHER PUBLICATIONS

Gal et al, "Dropout as a Bayesian approximation: Representing model uncertainty in deep learning," Proceedings of the 33rd International Conference on Machine Learning, arXiv: 1506.02142v6, Oct. 4, 2016. (Year: 2016).*

Malinin et al., "Predictive Uncertainty Estimation via Prior Networks", arXiv: 1802.10501, pub. date on Feb. 28, 2018, pp. 1-17. (Year: 2018).*

Kachman et al., "Novel Uncertainty Framework for Deep Learning Ensembles", axXIV ID: 1904.04917, Apr. 9, 2019. (Year: 2019).*

Ramalho et al., "Density estimation in representation space to predict model uncertainty", arXiv: 1908.07235, pub. date on Aug. 20, 2019, pp. 1-10. (Year: 2019).*

Sheikholeslami et al., "Minimum Uncertainty Based Detection of Adversaries in Deep Neural Networks," 2020 Information Theory and Applications Workshop (ITA), Feb. 2020, pp. 1-16. (Year: 2020).*

Meijerink et al., "Uncertainty estimation for classification and risk prediction on medical tabular data", arXiv: 2004.05824, pub. date on Apr. 13, 2020, pp. 1-15. (Year: 2020).*

Combalia et. al., "Uncertainty Estimation in Deep Neural Networks for Dermoscopic Image Classification", 2020 IEEE/CVF Conference on Computer Vision and Pattern Recognition Workshops (CVPRW), Jun. 2020, pp. 3211-3220. (Year: 2020).*

Mallick et al., "Probabilistic Neighbourhood Component Analysis: Sample Efficient Uncertainty Estimation in Deep Learning", arXiv: 2007.10800, pub. date on Jul. 18, 2020, pp. 1-11. (Year: 2020).*

Yang et al., "Diagnosing Concept Drift with Visual Analytics", arXiv: 2007.14372v3, Sep. 15, 2020, Accepted for IEEE Conference on Visual Analytics Science and Technology (VAST) 2020. (Year: 2020).*

Gal et al., "Dropout as a Bayesian Approximation: Representing Model Uncertainty in Deep Learning", Proceedings of the 33rd International Conference on Machine Learning, New York, NY, USA, 2016, JMLR: W&CP vol. 48, arXiv:1506.02142v6 [stat.ML] Oct. 4, 2016, 12 pages.

Gammelsaeter, Martin, "A Committee of One: Using Dropout for Active Learning in Deep Networks," Master of Science in Computer Science, Department of Computer and Information Science, Norwegian University of Science and Technology, Submission date: Aug. 2015, 80 pages.

Kwon et al., "Uncertainty quantification using Bayesian neural networks in classification: Application to ischemic stroke lesion segmentation", 1st Conference on Medical Imaging with Deep Learning (MIDL 2018), Amsterdam, the Netherlands, 13 pages.

Mehrtash et al., "Confidence Calibration and Predictive Uncertainty Estimation for Deep Medical Image Segmentation," arXiv:1911.13273v1 [eess.IV] Nov. 29, 2019, 11 pages, <https://arxiv.org/abs/1911.13273>.

Mell et al., "The NIST Definition of Cloud Computing", Recommendations of the National Institute of Standards and Technology, Special Publication 800-145, Sep. 2011, 7 pages.

Mobiny et al., "Risk-Aware Machine Learning Classifier for Skin Lesion Diagnosis", Journal of Clinical Medicine, 2019, 8, 1241, MDPI, Published: Aug. 17, 2019, 24 pages, doi:10.3390/jcm8081241.

Roy et al., "Bayesian QuickNAT: Model Uncertainty in Deep Whole-Brain Segmentation for Structure-wise Quality Control", arXiv:1811.09800v1 [cs.CV] Nov. 24, 2018, 12 pages, <https://arxiv.org/abs/1811.09800>.

Srinidhi et al., "Deep neural network models for computational histopathology: A survey", arXiv:1912.12378v1 [eess.IV] Dec. 28, 2019, 45 pages, <https://arxiv.org/abs/1912.12378>.

* cited by examiner

QUANTIFYING MACHINE LEARNING MODEL UNCERTAINTY

BACKGROUND

The disclosure relates generally to quantifying machine learning model uncertainty. The disclosure relates particularly to quantifying machine learning model performance uncertainty for input data outside a training data set.

Deep learning models, such as convolutional neural network plus classification models, may be trained to classify an input image. For example, a deep learning model may be trained to classify a mammogram image, as negative (cancer free), benign, or malignant. The expectation for such models is that the models deliver consistent results regardless of the scanning site equipment used in obtaining the input image.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the evaluation of machine learning model classifications to quantify model classification result certainty/uncertainty.

Aspects of the invention disclose methods, systems and computer readable media associated with evaluating machine learning model classifications by training a machine learning classification model using a training data set from a first data distribution, determining a classification for test data from a second data distribution using the machine learning classification model, wherein the first data distribution and second data distribution are disjoint distributions, determining an uncertainty for the classification of the test data according to a difference between the first data distribution and the second data distribution.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
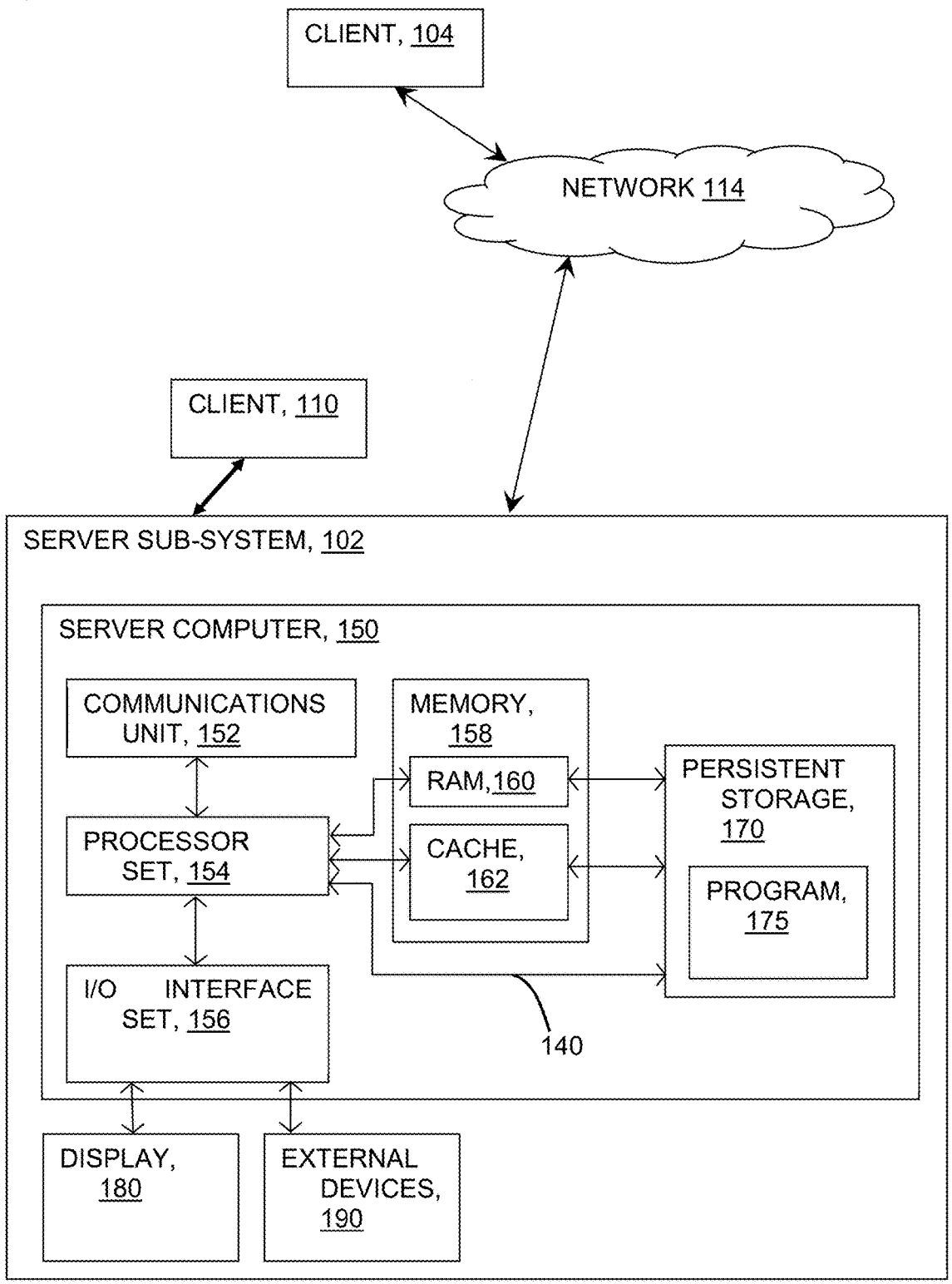
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., training a machine learning classification model using a training data set from a first data distribution, determining a classification for test data from a second data distribution using the machine learning classification model, determining an uncertainty for the classification of the test data according to a difference between the first data distribution and the second data distribution, etc.). These solutions are not abstract and cannot be performed as a set of mental acts by a human due to the processing capabilities needed to facilitate model classification uncertainty, for example. Further, some of the processes performed may be performed by a specialized computer for carrying out defined tasks related to uncertainty quantification. For example, a specialized computer can be employed to carry out tasks related to quantifying model classification uncertainty, or the like.

Machine learning models, including convolutional neural networks (CNN) typically have millions of parameters that need to be learned for acceptable classification performance. However, training on a limited training data set can result in overfitting the model to the training set and can reduce the classification performance on an unseen test data set. For example, a model trained using mammogram images from a set of mammogram imaging centers may become overfitted to images from that set of imaging centers and may suffer poor prediction results for imaging centers outside that set.

Given a single screening mammogram image (cranio-caudal (CC) or medio-lateral oblique (MLO) view), a model may classify it as negative (no cancer present), benign (benign features present), or malignant (malignant features present). Deep learning models—typically convolutional neural networks—can be trained to input image(s) from a patient and to output a label belonging to the set: {negative, benign, malignant}. Expectations for such models include consistently delivering accurate results on screening mammograms acquired at a wide array of scanning sites with scanners from different manufacturers, and on individuals from a wide array of populations with differing breast geometry and density, without any bias. However, most trained models are not robust to such variations in acquisition or subject population. Once trained, the models yield results on test data which are biased towards test data that "looks like"—or is from the same distribution as—the training data. Performance on test data that is from a different distribution than the training data tends to be sub-optimal. The training data set will not include all the training data in the world and there will always be some unseen distribution somewhere. Further, there may not be an immediate indication that the model performance is sub-optimal as the ground truth labels for test data in a real-life scenario where our models are deployed at a new site are not available. Quantifying the classification result certainty/uncertainty enables analysts to alert the users and improve the classification algorithm by adding data from this test site to the training data corpus.

Disclosed embodiments enable quantifying classification result certainty/uncertainty. The embodiments include the development of a testing scheme which quantifies how uncertain a model is when predicting for a given test image. Embodiments yield low classification result uncertainty values (high confidence values) when the test image comes from the same distribution as the training data.

It may not be practical to train a model using training data from all possible test data sources, such as all possible mammogram imaging centers. Analyzing input data from testing sources outside those of the test data yields suboptimal classification performance. The extent of the suboptimal performance may be unknown as ground-truth labels for the test data do not exist for data outside the training data set. Determining model classification certainty/uncertainty levels provides a user with valuable information associated with the model's classification of the test data. Certainty/uncertainty levels provide insight regarding the relative benefits to the model of adding test data from new data sources to the training data set. Disclosed systems and methods enable a determination of the certainty/uncertainty associated with the classification of input test data by a model.

Training data augmentation is one of the many techniques used to train a CNN to be robust to test data variations that might not be present in the training set. Robustness relates to the ability of the trained model to accurately classify test data which differs from the training data. Augmentations include geometrical transformations such as rotations, flips, or deformable transforms, and intensity transformations such as scaling, histogram matching etc. The existing training data samples are randomly transformed and introduced during the model training epochs with the same label as the original untransformed samples to force the network model to learn to predict the same label despite the transformations in the sample. For example, the set of mammogram images may be transformed as described above. For the example, both the original and transformed images may be utilized in training the classification model. Due to the high number of parameters in the CNN, it can learn to map both the transformed and untransformed samples to the same label thereby learning to be robust to the transformation.

In an embodiment, the method receives a first data distribution, an input data set associated with the intended use of the trained model, e.g., a model intended for mammogram image analysis receives a set of historic mammogram images from one or more imaging devices and/or imaging centers. The received images constitute labeled data and include a characterization of the image in line with the desired characterizations of the trained model. For example, providing a model training data labeled as negative (no cancer found), benign (only benign elements found), or malignant (malignant cancerous elements found) enables the model to train a classifier capable of classifying new test images as one of the three training set labeled categories. The training data set may be augmented using geometric or scaling transformations as described above or used without augmentation.

Using a machine learning model, such as a CNN, the method processes the training data images, reducing the millions of features associated with the pixels of the training images to a feature space associated with thousands of features.

After training the model, the method utilizes the trained model for classifying test data from a second data distribution. In this embodiment, the first data distribution and the second data distribution constitute disjoint sets—there is no overlap between the data contained in the two distributions. The trained model evaluates the test data utilizing the node weights determined during the training process and generates a classification result for each test data sample, a classification of negative, benign, or malignant for the mammogram images. The method then determines a level of uncertainty for the classification of each image from the test data.

The method determines classification result uncertainty by evaluating the differences between the training data set distribution and the test data set distribution. In an embodiment, the method utilizes node weight dropout when classifying test data as a way of evaluating the differences between the distributions. In this embodiment, the method randomly alters some node weights of the trained network. The altered weights are set to a value of zero, effectively dropping those nodes out of the network during the classification task. The method classifies each test image multiple times (20-30 times is ideal) with different sets of node weights dropped out for each test. The multiple classifications yield a classification distribution related to the differences between the two data distributions. For instance where the two distributions are similar, the classification distribution resulting from the dropout based classifications will have a narrow range indicating a high level of certainty or confidence in the classification as the test data features used in classification yield a similar classification result regardless of node weight dropouts. For dissimilar distributions, node weight dropouts yield a broader distribution of classification results as the test data features used for classification yield a larger range of classification results across the set of node weight dropout classifications. The method determines the quantified uncertainty of the classification results as directly related to the shape of the dropout classification distribution. The wider the distribution, the more uncertain the trained model is. Disclosed embodiments quantify the distribution width using an estimate of the standard deviation of the classification probability values. If it is high, the classification is uncertain.

In an embodiment, the method concurrently trains the classification model, such as the CNN, and a variational autoencoder (VAE). The CNN trains using the labeled data of the training data set. The VAE learns an embedding of the training data set distribution in terms of the feature set used by the CNN. The VAE learns the mean, $\mu$, and standard deviation $\sigma$, for a learned embedding of the training data set. The CNN learns to classify against the same distribution $\mu$ and $\sigma$. In this embodiment, the method utilizes the trained model to classify test data from a distribution which is disjoint with the training data distribution. The method applies the VAE to a test data sample. The VAE outputs the embedding for features of the test data sample. The method compares the embedding of the test data sample with the $\mu$ of the training data distribution by calculating the distance between the two vectors and then dividing that distance by the determinant of the training data set distribution $\sigma$. For results greater than a defined threshold, such as 3, the method concludes that the test sample does not belong to the training data distribution and the model result should not be trusted as it is expected to be very uncertain.

For methods using the VAE distance between the test embedding and training distributions, as well as methods using the multiple node dropout classifications and accompanying classification result distribution, the method determines a level of certainty/uncertainty. The method then compares the determined uncertainty to a defined threshold, such a value of 3. The threshold may be defined as a default value or may be defined according to user input. For uncertainty values above the threshold, the method provides an output to a user. The output accompanies the classification result determined for the test data and indicates that the model uncertainty associated with the result is above the threshold. In an embodiment, the method provides the uncertainty quantification regardless of the relationship of the uncertainty to the threshold.

In an embodiment, dropout classifications and VAE based distance comparison are used in combination. In this embodiment, the method determines an uncertainty level according to both the dropout classification distribution and the distribution of VAE distances associated with the classifications of the dropout classification distribution. In this embodiment, the method performs a plurality of classifications using dropout. The method creates a distribution of the classifications determined using dropout. For each test data instance, the method also determines a distance between the classification and the training data distribution using the embedding for the test data according to the VAE, as described above. The method compares each of the dropout-based distribution and VAE-based distance to the relevant threshold values. The method outputs the uncertainty determinations from each of the two methods to a user.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise a results uncertainty quantification program (not shown) together with sufficient computing resource (processor, memory, network communications hardware) to execute the program. Execution of the disclosed steps of determining the results uncertainty may be divided between client devices and the server sub-system. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the machine learning program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., machine learning program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
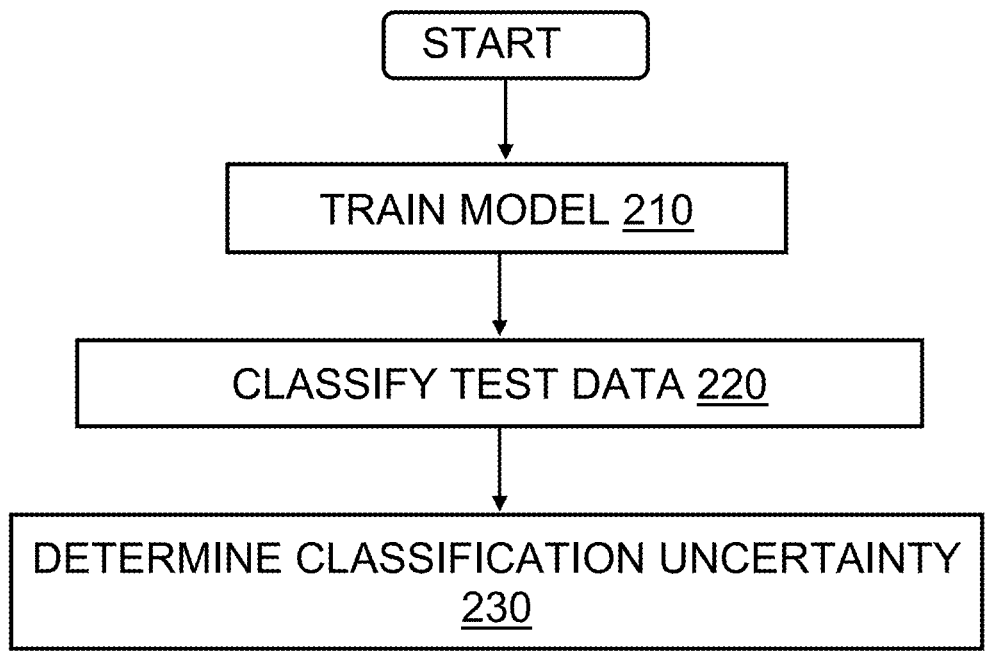
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of results uncertainty quantification program 175 receives an input data set for training the model. The input data resembles but is disjoint with the test data the model will be used to classify after training. The method trains a classification model using the input data distribution. In an embodiment, the method maps the input training data set to a reduced dimensionality feature space using a machine learning model such as a convolutional neural network, or other dimension reducing model.

At block 220, the method of results uncertainty quantification program 175 applies the trained classification model to test data from a data distribution which is disjoint with the training data distribution. The application of the model to the test data yields a classification of the test data.

At block 230, the method determines an uncertainty for the classification determined for the test data. In an embodiment, the method uses node weight dropouts during the classification of the test data. In this embodiment, the method drops out randomly selected node weights while classifying the test data. The method classifies the test data a plurality of times. During each classification of a single instance of test data, the method drops out a unique set of node weights, leaving behind a subset of the original set of node weights. The method then generates a classification using the remaining subset of node weights. The method generates a classification distribution for each instance of test data using the results of the plurality of classifications for the test data instance. In this embodiment, the method determines the results classification uncertainty according to the distribution of the dropout-based classifications. Test data which is similar to the training data distribution yields a narrow dropout-based distribution having a small standard deviation and indicating a low level of uncertainty, and a corresponding high level of certainty in the classification result. Test data from a distribution which differs significantly from the training data distribution yields a dispersed dropout-based classification distribution having a large standard deviation and indicating a high level of uncertainty and a low level of certainty in the classification.

In an embodiment, the method determines uncertainty for the classification results through the use of a variational auto-encoder (VAE). The method trains the VAE during the training epochs of the machine learning model CNN. The trained VAE includes an embedding of the training data set distribution. The embedding distribution may be characterized using a \mu mean and \sigma standard deviation of the distribution. After training, the method uses the trained model to evaluate test data taken from a distribution which is disjoint with the training data set. The CNN provides a classification result for the test data instance. The VAE provides an embedding for the test data instance. The method determines a distance separating the test data embedding and the training data set distribution using the training data set \mu and \sigma. The method determines the uncertainty for the classification result according to the determined distance between the test data embedding and the training data set distribution. Larger distances indicate less similarity between the training data distribution and the test data distribution and also indicate less certainty in the classification result. Smaller distances indicate more similarity between the two data distributions and a higher level of certainty—a lower level of uncertainty—in the classification result.

In either embodiment, the method may compare the determined uncertainty for the classification result to a defined threshold for the uncertainty. The method provides an output including the model's classification of the test data instance together with the determined uncertainty and an indication that the determined uncertainty exceeds the defined threshold. In an embodiment, the method provides only the classification result and the determined uncertainty for the result.

Though the method has been described using mammogram images as an example, applications of the method are not limited to mammogram classification. The method may be used to train models for other medical diagnostic imaging analyses tasks as well as the analysis of other images and also other large data sets having millions of features and benefiting from dimensionality reduction as accomplished by the method. The method may be beneficially applied to classification tasks where achieving robustness across a broad range of input data sources beyond the benefits available through augmenting the training data set by geometric or scaling transformations.

In an embodiment, the method utilizes expansive amounts of computing resources which may include the utilization of edge cloud or cloud resources accessed via a network environment. The edge cloud and/or cloud resources may be utilized in the development and training of the model as well as during the evaluation of test data and the determination of test data classification uncertainty.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
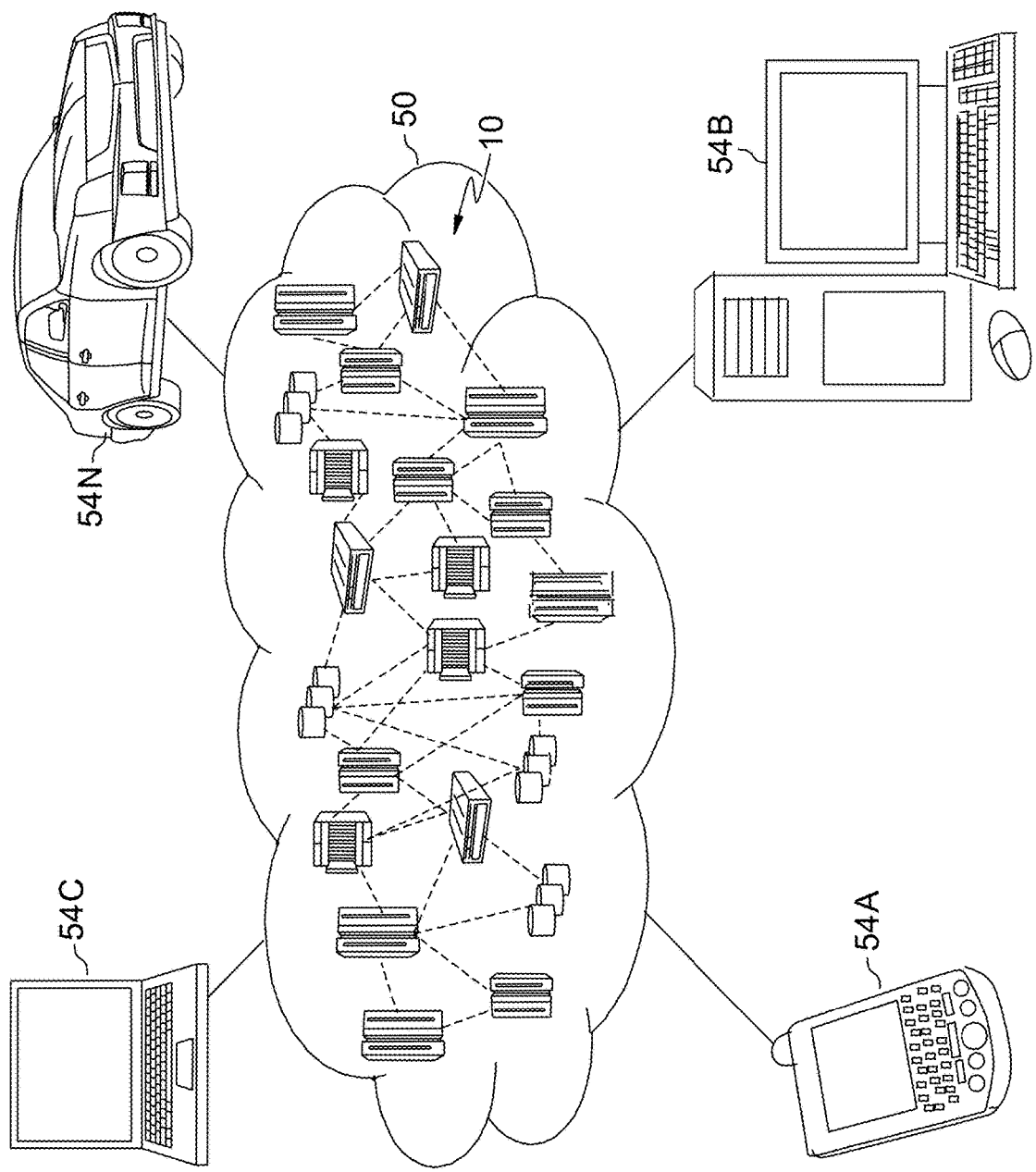
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
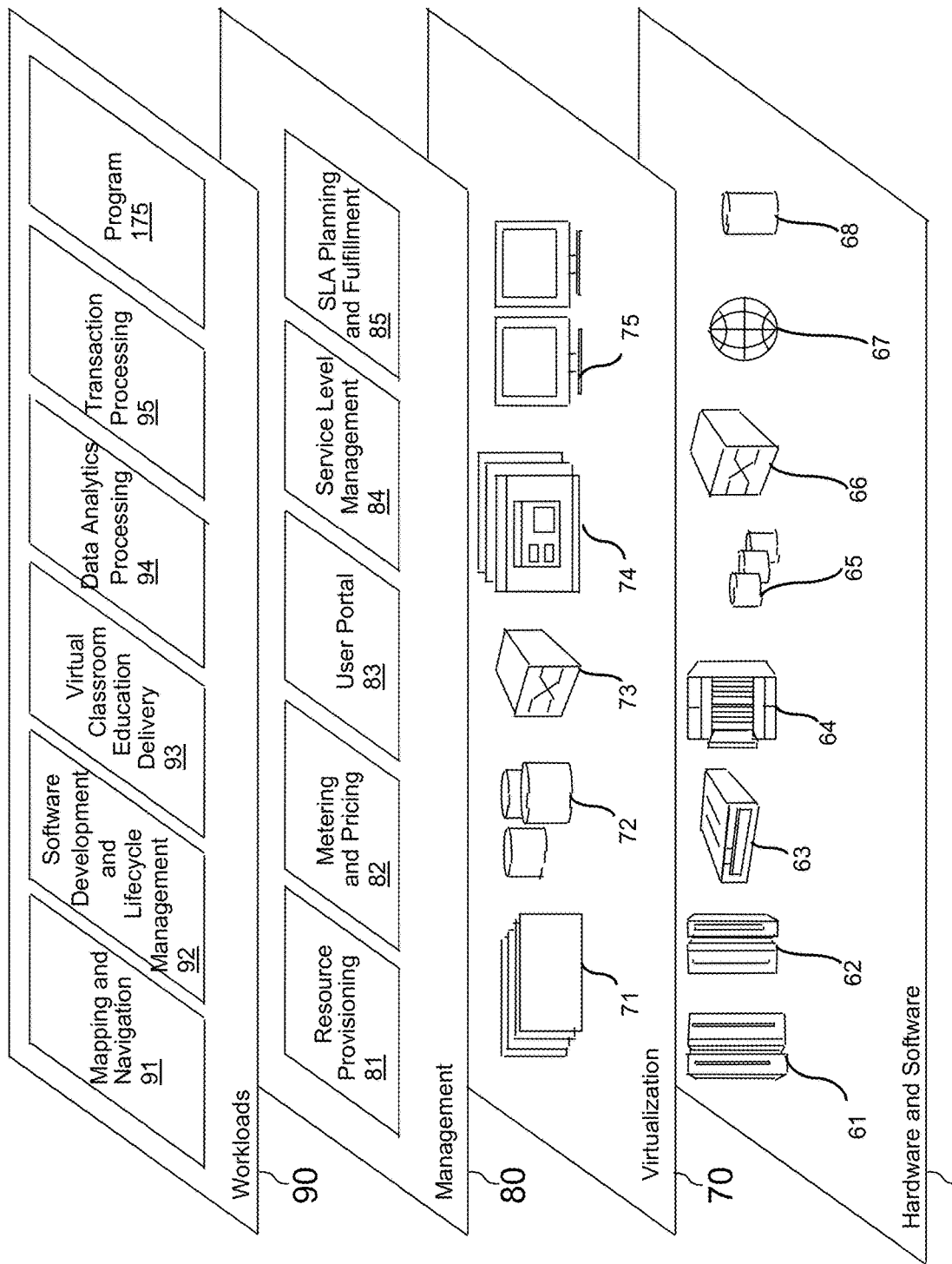
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for evaluating machine learning model classifications, the method comprising:
    receiving a training data set over a network;
    training, by one or more computer processors, the machine learning classification model using the training data set having a first data distribution;
    receiving, by the one or more processors, over the network, a second data distribution;
    determining, by the one or more computer processors using the machine learning classification model, a classification for test data from the second data distribution;
    determining, by the one or more computer processors, a dropout classification distribution of the test data from the second data distribution using the machine learning classification model, wherein the first data distribution and the second data distribution are disjoint distributions;
    determining, by the one or more computer processors, an uncertainty for the classification of the test data according to a shape of the dropout classification distribution;
    providing an alert to a user for adding data from the second data distribution to the training data set according to the determined uncertainty;
    adding, by the one or more computer processors, the data from the second data distribution to the training data set according to the determined uncertainty, yielding a modified training data set; and
    re-training, by one or more computer processors, the machine learning classification model using the modified training data set.

2. The computer implemented method according to claim 1, further comprising comparing, by the one or more computer processors, the uncertainty to a defined threshold and providing an output according to the comparison.

3. The computer implemented method according to claim 1, wherein the machine learning classification model comprises a convolutional neural network model.

4. The computer implemented method according to claim 1, wherein determining the uncertainty comprises:
    determining a plurality of classifications for the test data using the machine learning classification model, wherein the machine learning classification model comprises a set of network node weights and wherein determination of each classification of the test data of the plurality of classifications utilizes a unique subset of the network node weights less than the set of network node weights;
    determining a probability distribution of the plurality of classifications for the test data; and
    determining the uncertainty according to the probability distribution.

5. The computer implemented method according to claim 4, further comprising:
    learning, by the one or more computer processors, a first embedding of the first data distribution using a variational autoencoder;
    determining, by the one or more computer processors, a second embedding for the test data according to the first embedding;
    determining, by the one or more computer processors, a distance between the test data and the first data distribution according to the second embedding; and
    determining, by the one or more computer processors, the uncertainty according to the distance.

6. The computer implemented method according to claim 1, further comprising:
    learning, by the one or more computer processors, a first embedding of the first data distribution using a variational autoencoder;
    determining, by the one or more computer processors, a second embedding for the test data according to the first embedding;
    determining, by the one or more computer processors, a distance between the test data and the first data distribution according to the second embedding; and
    determining, by the one or more computer processors, the uncertainty according to the distance.

7. The computer implemented method according to claim 6, further comprising:
    comparing, by the one or more computer processors, the distance to a defined threshold distance; and
    providing, by the one or more computer processors, an uncertainty output according to the comparison.

8. A computer program product for evaluating a machine learning model classification, the computer program product comprising one or more computer readable storage devices and collectively stored program instructions on the one or more computer readable storage devices, the stored program instructions comprising:
    program instructions to receive a training data set over a network;
    program instructions to train the machine learning classification model using the training data set having a first data distribution;
    program instructions to receive, over the network, a second data distribution;
    program instructions to determine a classification for test data from the second data distribution, using the machine learning classification model;
    program instructions to determine a dropout classification distribution for the test data from the second data distribution using the machine learning classification model, wherein the first data distribution and the second data distribution are disjoint distributions;
    program instructions to determine an uncertainty for the classifications of the test data according to a shape of the dropout classification distribution;
    program instructions to provide an alert to a user for adding data from the second data distribution to the training data set according to the determined uncertainty;
    program instructions to add the data from the second data distribution to the training data set according to the determined uncertainty, yielding a modified training data set; and
    program instructions to re-train the machine learning classification model using the modified training data set.

9. The computer program product according to claim 8, the stored program instructions further comprising program instructions to compare the uncertainty to a defined threshold and provide an output according to the comparison.

10. The computer program product according to claim 8, wherein the machine learning classification model comprises a convolutional neural network model.

11. The computer program product according to claim 8, wherein the program instructions to determine the uncertainty comprise:
   program instructions to determine a plurality of classifications for the test data using the machine learning classification model, wherein the machine learning classification model comprises a set of network node weights and wherein determination of each classification of the test data of the plurality of classification utilizes a unique subset of the network node weights less than the set of network node weights;
   program instructions to determine a probability distribution of the plurality of classifications for the test data; and
   program instructions to determine the uncertainty according to the probability distribution.

12. The computer program product according to claim 11, the stored program instructions further comprising:
   program instructions to learn a first embedding of the first data distribution using a variational autoencoder;
   program instructions to determine a second embedding for the test data according to the first embedding;
   program instructions to determine a distance between the test data and the first data distribution according to the second embedding; and
   program instructions to determine the uncertainty according to the distance.

13. The computer program product according to claim 8, the stored program instructions further comprising:
   program instructions to learn a first embedding of the first data distribution using a variational autoencoder;
   program instructions to determine a second embedding for the test data according to the first embedding;
   program instructions to determine a distance between the test data and the first data distribution according to the second embedding; and
   program instructions to determine the uncertainty according to the distance.

14. The computer program product according to claim 13, the stored program instructions further comprising:
   program instructions to compare the distance to a defined threshold distance; and
   program instructions to provide an uncertainty output according to the comparison.

15. A computer system for evaluating a machine learning model classification, the computer system comprising:
   one or more computer processors;
   one or more computer readable storage devices; and
   stored program instructions on the one or more computer readable storage devices for execution by the one or more computer processors, the stored program instructions comprising:
   program instructions to receive a training data set over a network;
   program instructions to train the machine learning classification model using the training data set having a first data distribution;
   program instructions to receive, over the network, a second data distribution;
   program instructions to determine a classification for test data from the second data distribution, using the machine learning classification model;
   program instructions to determine a dropout classification distribution for the test data from the second data distribution using the machine learning classification model, wherein the first data distribution and the second data distribution are disjoint distributions;
   program instructions to determine an uncertainty for the classifications of the test data according to a shape of the dropout classification distribution;
   program instructions to provide an alert to a user for adding data from the second data distribution to the training data set according to the determined uncertainty;
   program instructions to add the data from the second data distribution to the training data set according to the determined uncertainty, yielding a modified training data set; and
   program instructions to re-train the machine learning classification model using the modified training data set.

16. The computer system according to claim 15, the stored program instructions further comprising program instructions to compare the uncertainty to a defined threshold and provide an output according to the comparison.

17. The computer system according to claim 15, wherein the machine learning classification model comprises a convolutional neural network model.

18. The computer system according to claim 15, wherein the program instructions to determine the uncertainty comprise:
   program instructions to determine a plurality of classifications for the test data using the machine learning classification model, wherein the machine learning classification model comprises a set of network node weights and wherein determination of each classification of the test data of the plurality of classification utilizes a unique subset of the network node weights less than the set of network node weights;
   program instructions to determine a probability distribution of the plurality of classifications for the test data; and
   program instructions to determine the uncertainty according to the probability distribution.

19. The computer system according to claim 18, the stored program instructions further comprising:
   program instructions to learn a first embedding of the first data distribution using a variational autoencoder;
   program instructions to determine a second embedding for the test data according to the first embedding;
   program instructions to determine a distance between the test data and the first data distribution according to the second embedding; and
   program instructions to determine the uncertainty according to the distance.

20. The computer system according to claim 15, the stored program instructions further comprising:
   program instructions to learn a first embedding of the first data distribution using a variational autoencoder;
   program instructions to determine a second embedding for the test data according to the first embedding;
   program instructions to determine a distance between the test data and the first data distribution according to the second embedding; and program instructions to determine the uncertainty according to the distance.

\* \* \* \* \*